United States Patent
Feng et al.

(10) Patent No.: US 9,088,584 B2
(45) Date of Patent: Jul. 21, 2015

(54) SYSTEM AND METHOD FOR NON-DISRUPTIVE MANAGEMENT OF SERVERS IN A NETWORK ENVIRONMENT

(75) Inventors: Chao Feng, San Jose, CA (US); Samar Sharma, San Jose, CA (US); Ronak Desai, Fremont, CA (US); Diheng Qu, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 631 days.

(21) Appl. No.: 13/329,023

(22) Filed: Dec. 16, 2011

(65) Prior Publication Data

US 2013/0155902 A1    Jun. 20, 2013

(51) Int. Cl.
 *G06F 11/00* (2006.01)
 *H04L 29/08* (2006.01)
 *G06F 11/20* (2006.01)

(52) U.S. Cl.
 CPC .......... *H04L 67/1031* (2013.01); *G06F 11/203* (2013.01); *G06F 11/2007* (2013.01); *G06F 11/2028* (2013.01); *G06F 11/2035* (2013.01); *G06F 11/2038* (2013.01)

(58) Field of Classification Search
 None
 See application file for complete search history.

(56) References Cited

U.S. PATENT DOCUMENTS

| | | | |
|---|---|---|---|
| 6,167,438 A | 12/2000 | Yates et al. | |
| 7,197,660 B1 * | 3/2007 | Liu et al. | 714/4.12 |
| 7,209,435 B1 | 4/2007 | Kuo et al. | |
| 7,231,462 B2 | 6/2007 | Bethaud et al. | |
| 7,558,261 B2 | 7/2009 | Arregoces et al. | |
| 7,567,504 B2 | 7/2009 | Darling et al. | |
| 7,571,470 B2 | 8/2009 | Arregoces et al. | |
| 7,610,375 B2 | 10/2009 | Portolani et al. | |
| 7,643,468 B1 | 1/2010 | Arregoces et al. | |
| 7,647,422 B2 | 1/2010 | Singh et al. | |
| 7,657,940 B2 | 2/2010 | Portolani et al. | |
| 7,668,116 B2 | 2/2010 | Wijnands et al. | |
| 7,860,095 B2 | 12/2010 | Forissier et al. | |
| 7,990,847 B1 * | 8/2011 | Leroy et al. | 370/216 |
| 8,291,108 B2 | 10/2012 | Raja et al. | |

(Continued)

FOREIGN PATENT DOCUMENTS

| | | |
|---|---|---|
| WO | WO2005/104650 | 11/2005 |
| WO | WO2013/090035 | 6/2013 |
| WO | WO2014/189670 | 11/2014 |

OTHER PUBLICATIONS

PCT—Apr. 4, 2013 International Search Report and Written Opinion from International Application No. PCT/US2012/067502 11 pages.

(Continued)

*Primary Examiner* — Robert C Scheibel
(74) *Attorney, Agent, or Firm* — Patent Capital Group

(57) ABSTRACT

An example method includes disengaging a target node from a cluster, where the disengaging comprises: selecting an inheritor; migrating flows from the target node to the inheritor; informing a migration manager that the target node is disengaged from the cluster; and broadcasting to peer nodes of the target node that the target node is replaced by the inheritor. In particular implementations of the present disclosure, the cluster can include a first layer of a network topology including a forwarding engine that implements hash-based packet forwarding; a second layer of the network topology comprising the target node and the inheritor, where the target node and the inheritor implement flow-based packet forwarding; and a third layer including service nodes configured for packet processing in a network.

17 Claims, 6 Drawing Sheets

(56) References Cited

U.S. PATENT DOCUMENTS

| | | | |
|---|---|---|---|
| 8,311,045 | B2 | 11/2012 | Quinn et al. |
| 8,442,043 | B2 | 5/2013 | Sharma et al. |
| 8,762,534 | B1* | 6/2014 | Hong et al. ............... 709/226 |
| 8,904,037 | B2 | 12/2014 | Haggar et al. |
| 2003/0088698 | A1* | 5/2003 | Singh et al. ............... 709/239 |
| 2003/0120816 | A1 | 6/2003 | Berthaud et al. |
| 2004/0264481 | A1* | 12/2004 | Darling et al. ............. 370/401 |
| 2004/0268357 | A1* | 12/2004 | Joy et al. ................... 718/105 |
| 2005/0257002 | A1* | 11/2005 | Nguyen ...................... 711/114 |
| 2006/0092950 | A1 | 5/2006 | Arregoces et al. |
| 2006/0095960 | A1 | 5/2006 | Arregoces et al. |
| 2006/0233106 | A1 | 10/2006 | Achlioptas et al. |
| 2007/0250836 | A1* | 10/2007 | Li et al. ..................... 718/105 |
| 2008/0177896 | A1 | 7/2008 | Quinn et al. |
| 2008/0225710 | A1* | 9/2008 | Raja et al. ................ 370/230.1 |
| 2009/0300407 | A1* | 12/2009 | Kamath et al. ................ 714/4 |
| 2009/0328054 | A1* | 12/2009 | Paramasivam et al. ....... 718/105 |
| 2010/0165985 | A1 | 7/2010 | Sharma et al. |
| 2012/0030365 | A1 | 2/2012 | Lidstrom et al. |
| 2013/0097323 | A1 | 4/2013 | Barsness et al. |
| 2013/0163594 | A1 | 6/2013 | Sharma et al. |
| 2013/0198412 | A1 | 8/2013 | Saito |
| 2013/0279503 | A1 | 10/2013 | Chiabaut |
| 2014/0188676 | A1 | 7/2014 | Marmolejo-Meillon et al. |
| 2014/0304412 | A1 | 10/2014 | Prakash et al. |
| 2014/0351452 | A1 | 11/2014 | Bosch et al. |

OTHER PUBLICATIONS

"A Redundant Architecture for Routing Protocols," ip infusion White Paper, Jun. 2002, XP002240009; 8 pgs. www.ipinfusion.com/pdf/WP_Redundancy_rev0602.pdf.

PCT—Jun. 30, 2008 International Search Report and Written Opinion from International Application No. PCT/IB05/01013; 5 pages.

PCT—Mar. 10, 2009 International Preliminary Report on Patentability from International Application No. PCT/IB05/01013; 5 pages.

U.S. Appl. No. 13/923,257, filed Jun. 20, 2013, entitled "Hierarchical Load Balancing in a Network Environment," Inventors: Hendrikus G. P. Bosch, et al.

U.S. Appl. No. 14/108,994, filed Dec. 17, 2013, entitled "Method for Implicit Session Routing," Inventors: Hendrikus G.P. Bosch, et al.

Bosch, et al., "Telco Clouds and Virtual Telco: Consolidation, Convergence, and Beyond", May 23-27, 2011, Proceedings of 2011 IFIP/IEEE International Symposium on Integrated Network Management (IM), Dublin, 7 pages.

Gray, et al., "Leases: An Efficient Fault-Tolerant Mechanism for Distributed File Cache Consistency," Proceedings of the Twelfth ACM Ssymposium on Operating Systems Principles, New York, NY (Dec. 3-6, 1989), 9 pages; http://www.stanford.edu/class/cs240/readings/89-leases.pdf.

Kim, et al., "Floodless in Seattle: A Scalable Ethernet Architecture for Large Enterprises," Computer Communication Review, Oct. 2008, 14 pages; http://www.cs.princeton.edu/~chkim/Research/SEATTLE/seattle.pdf.

Lampson, "How to Build a Highly Available System Using Consensus," Proceedings of the 10th International Workshop on Distributed Algorithms (Oct. 1996), 17 pages; http://research.microsoft.com/en-us/um/people/blampson/58-Consensus/Acrobat.pdf.

Pang, Distributed Hash Tables, Spring 2004, 33 pages; http://www.cs.cmu.edu/~dga/15-744/S07/lectures/16-dht.pdf.

Rescorla, "Introduction to Distributed Hash Tables," Proceedings of the sixty-seventh Internet Engineering Task Force, IAB Plenary, Nov. 5-10, 2006, San Diego, CA, 39 pages; http://www.ietf.org/proceedings/65/slides/plenaryt-2.pdf.

Wu, et al., "Resilient and efficient load balancing in distributed hash tables," Journal of Network and Computer Applications vol. 32 (Jan. 2009), 16 pages; http://sist.sysu.edu.cn/~dwu/papers/jnca09-lb.pdf.

PCT Jun. 26, 2014 International Preliminary Report on Patentability from International Application PCT/US2012/067502.

Fernando et al., "Virtual Topologies for Service Chaining in BGP IP VPNs; draft-rfernando-13vpn-service-chaining-01," Internet Engineering Task Force, Feb. 25, 2013; 16 pages.

Fang et al., "BGP IP BPN Virtual PE; draft-fang-13vpn-virtual-pe-02," Internet Engineering Task Force, Apr. 7, 2013; 26 pages.

PCT Nov. 10, 2014 International Search Report from International Application No. PCT/US2014/036907; 3 pages.

Rosen et al., "BGP/MPLS IP Virtual Private Networks (VPNs)," Network Working Group, RFC 4364, Feb. 2006; 47 pages.

USpto Apr. 28, 2015 Non-Final Office Action from U.S. Appl. No. 14/108,994.

Bitar, et al., "Interface to the Routing System (I2R5) for Service Chaining: Use Cases and Requirements," draft-bitar-i2rs-service-chaining-00.txt; Internet Engineering Task Force, IETF Standard Working Draft; Jul. 15, 2013; 30 pages.

Mackie, B., et al., "Service Function Chains Using Virtual Networking," draft-mackie-sfc-using-virtual-networking-o2.txt; Internet Engineering Tas Force, IETF Standard Working Draft, Oct. 17, 2013; 44 pages.

PCT Mar. 16, 2015 International Search Report and Written Opinion from International Application No. PCT/US2014/066629.

\* cited by examiner

FIG. 6 — 140

FlowTable:
{
  Key: flow (source IP, source port, destination IP, destination port, protocol)
  Action_Network (forward, or rewrite, or redirect)
  Action_Application (compress, decompress, encrypt, decrypt, cache, etc.)
}

FIG. 7 — 150

Migration-Client::memberServer_discharge()
{
  flow_migrate();
  remove this member from Forwarding Engine;
  wait until FlowTable is empty AND no data packet is pending in NIC's RX/TX queues;
  set memberStatus to DISCHARGED_FROM_CLUSTER;
}

FIG. 8 — 160

Migration-Client::flow_migrate()
{
  myInheritor = the member who has the least number of flows;
  flow_migration = on;
  copy FlowTable to myInheritor's FlowTable;
  broadcast to all the members that myInheritor is the owner of all the flow entries in FlowTable;
  purge FlowTable;
}

FIG. 9

```
Main::flow_handler(packet_a)
{
        if (flow_migration is on)
                {
                redirect the packet to myInheritor;
                return;
                } if (packet_a is SYN)
                {
                create flow_a;
                define flow_a's action per the service;
                process flow_a per the action;
                define reverse_flow_a and its action;
                insert flow_a and reverse_flow_a and their actions into FlowTable;
                broadcast to all the members to declare this member is the owner of flow_a
                and reverse_flow_a;
                forward packet_a per the destination;
                }
        else if (packet_a matches flow_a which has a different owner)
                {
                redirect packet_a to the owner;
                }
        else
                {
                process flow_a per the matched action(s);
                forward the packet per the destination;
                if (packet_a is FIN/RST)
                        {
                        remove flow_a from FlowTable;
                        }
                }
}
```

170

SYSTEM AND METHOD FOR NON-DISRUPTIVE MANAGEMENT OF SERVERS IN A NETWORK ENVIRONMENT

TECHNICAL FIELD

This disclosure relates in general to the field of communications and, more particularly, to a system and a method for non-disruptive management of servers in a network environment.

BACKGROUND

Recent advances in high-speed networks and improved microprocessor performance are making computer clusters appealing to enterprises. Some of this allure is associated with enterprises being able to provide cost-effective parallel computing. Clusters that are built using commodity hardware and software components are redefining the computing world. Enterprises may maintain a computer cluster, such as a server farm, to accomplish server needs, which extends beyond the capability of a single computer. Computer clusters may be co-located with network switches and/or routers, which collectively enable communication between different parts of the cluster and the users of the cluster. Effective management of large computer clusters typically includes redundancy capabilities, automatic failover features, and the ability for a rapid reconfiguration of the computer cluster.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 is a set of example flow table entries that may be associated with an embodiment of the communication system in accordance with the present disclosure;

FIG. 7 is a simplified algorithm illustrating a set of example activities that may be associated with embodiments of the communication system in accordance with the present disclosure;

FIG. 8 is a simplified algorithm illustrating another set of example activities that may be associated with embodiments of the communication system in accordance with the present disclosure; and FIG. 9 is a simplified algorithm illustrating yet another set of example activities that may be associated with embodiments of the communication system in accordance with the present disclosure.

DETAILED DESCRIPTION OF EXAMPLE EMBODIMENTS

Overview

An example method includes disengaging a target node from a cluster, where the disengaging comprises: selecting an inheritor; migrating flows from the target node to the inheritor; informing a migration manager that the target node is disengaged from the cluster; and broadcasting to peer nodes of the target node that the target node is replaced by the inheritor. In particular implementations of the present disclosure, the cluster can include a first layer of a network topology including a forwarding engine that implements hash-based packet forwarding; a second layer of the network topology comprising the target node and the inheritor, where the target node and the inheritor implement flow-based packet forwarding; and a third layer including service nodes configured for packet processing in a network.

The inheritor can include a peer node of the target node having a least number of flows within a subset of nodes of the cluster. In addition, the inheritor can include a new peer node in the cluster. Selection of the inheritor can include receiving flow-handling statistics of peer nodes from the migration manager; and distributing the flows among the peer nodes based on the flow handling statistics so that a total number of flows being handled by the peer nodes are evenly distributed. In addition, the target node may include a flow-packet distributor.

The migrating may include duplicating (i.e., replicating at least a portion of) a flow table to be provided to the inheritor. In addition, the method may include purging the flow table; identifying that the flow table is empty and no data packet is pending in a receive/transmit (RX/TX) queue of the target node; and setting a status of the target node to indicate that the target node is disengaged from the cluster. The method may also include redirecting a packet from the target node to the inheritor. The method may also include providing instructions for a removal of the target node; identifying a confirmation that the target node is removed; and changing a hash scope in a hashing algorithm to remove the target node.

Example Embodiments

Figure 1:
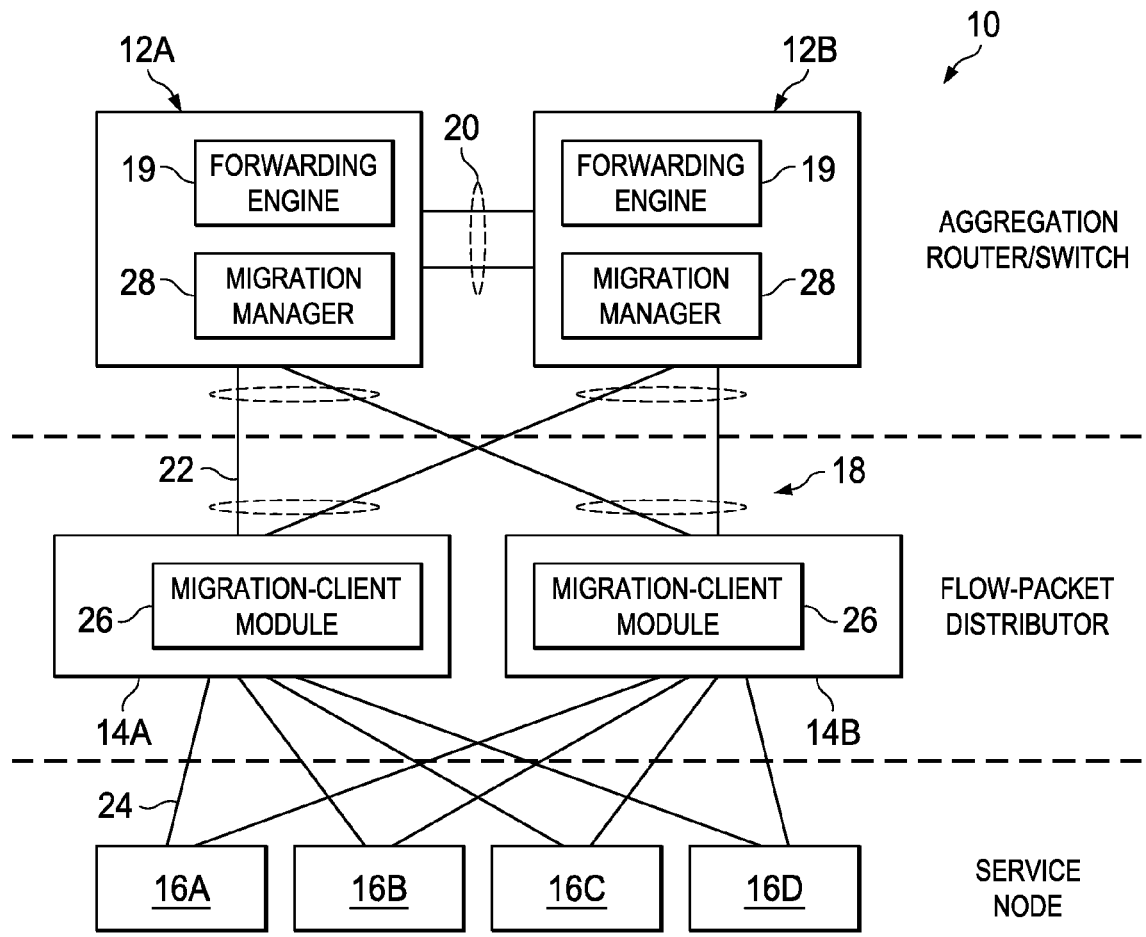
FIG. 1 is a simplified diagram of one embodiment of a communication system in accordance with the present disclosure.

Turning to FIG. 1, FIG. 1 is a simplified block diagram of communication system 10 according to an embodiment of the present disclosure. The architecture of FIG. 1 may include aggregation routers/switches 12A and 12B that are connected to flow-packet distributors (FD) 14A and 14B, which in turn connect to service nodes 16A, 16B, 16C, and 16D in a cluster 18. As used herein, the term "cluster" refers to a group of nodes in communication with each other, and which work together (e.g., to perform computing processes, network services, etc.: often in parallel). As used herein, the term "node" is meant to encompass any servers, computers, network appliances, routers, switches, gateways, bridges, loadbalancers, firewalls, processors, or any other suitable physical device, or physical component capable of exchanging information in a network environment. In an example implementation, cluster 18 is a server cluster in a data center.

Elements of FIG. 1 may be coupled to one another through one or more interfaces employing any suitable connection (wired or wireless), which provides a viable pathway for electronic communications. Additionally, any one or more of these elements of FIG. 1 may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs.

In operation, service nodes 16A-16D are configured to provide services such as packet processing, network services, application services, etc. Examples of service nodes may include an email server, a web server, a storage server, a firewall, a server loadbalancer, a content caching server, etc. Aggregation routers/switches 12A-12B include nodes that connect portions of the network and, further, are capable of inspecting packets (e.g., data packets) as they are received. Additionally, aggregation routers/switches 12A-12B are configured for determining the source and destination device of each packet, and then forwarding them appropriately. Aggregation routers/switches 12A-12B may also include nodes that combine multiple network connections in parallel (e.g., to increase throughput beyond that which a single connection could sustain, or to provide redundancy in case one of the links fails, etc.). Note that the terminology 'aggregation routers/switch' is used interchangeably with the more general term "switch" as used in this Specification. Examples of such devices include routers (e.g., devices that forward packets between computer networks), aggregation routers, aggregation switches, network bridges, Layer 3 switches, multilayer switches, gateways, etc.

Flow-packet distributors include nodes that intercept packets from aggregation routers/switches and process them as needed. The processing can be based on the flows identified, and/or other factors such as the number of nodes in the cluster, where packets can be further directed (e.g., forwarded, redirected, etc.) to appropriate service nodes. FDs 14A-14B may be capable of ensuring a correct packet sequence for packets that belong to the same flow. In various embodiments, the FDs are aware of all flows in the cluster, and can determine the owner of any single flow (e.g., through a hashing algorithm). In some embodiments, FD 14A and 14B may be standalone devices. In other embodiments, FD 14A and 14B may be integrated into service nodes 16A-D. Examples of flow-packet distributors include switches, routers, servers, processors, engines, etc. that are equipped with appropriate applications for performing the intended flow-packet distribution functions.

According to embodiments of the present disclosure, cluster 18 may implement a layered design in a two-stage network environment combining hash-based and flow-based packet forwarding. A first layer can include aggregation router/switch 12A and 12B, which are equipped with a suitable forwarding engine 19 that implements hash-based packet forwarding. A second layer can include nodes that implement flow-based packet forwarding. Network traffic between the first layer and the second layer may use the hash-based packet-forwarding scheme. Network traffic in the second layer, and between the second layer and other layers (such as a third layer), may use a flow-based packet-forwarding scheme.

According to an embodiment of the present disclosure, aggregation router/switch 12A and 12B may be connected in the first layer via a virtual portchannel (vPC) link 20, which may comprise a multiport 10 Gigabit Ethernet PortChannel (e.g., IEEE 802.3ad PortChannel). In one embodiment, the first layer may provide a high-speed packet switching backplane for flows entering and leaving the cluster 18. The first layer may be connected to the second layer (e.g., at the layer of FDs 14A and 14B) via various links, such as 10 Gigabit Ethernet (GigaE) links. For example, aggregation router/switch 12A is connected to FD 14A through link 22, which may be a 10 GigaE link.

The second layer may perform various functions such as service module integration, server classification, packet redirection, packet encapsulation, etc. The second layer may be connected to the third layer (e.g., at the layer of service nodes 16A-D) via various links such as 10 Gigabit Ethernet (GigaE) links, Gigabit Ethernet links, etc. For example, FD 14A is connected to service node 16A through link 24, which may be a Gigabit Ethernet link. In various embodiments, the links in cluster 18 may implement link aggregation. A packet traversing cluster 18 may follow a path from aggregation router/switch 12A to service node 16A as follows: the packet may be sent by aggregation router/switch 12A to FD 14A via link 22 using a hashing algorithm (i.e., a hash-based packet forwarding scheme), and the packet may be forwarded by FD 14A to its destination service node 16A on link 24 using flow-packet distribution (i.e., a flow-based packet forwarding scheme).

According to certain implementations of the present disclosure, a migration-client module 26 may be provisioned in each of FDs 14A and 14B. In some embodiments, migration-client module 26 may be a standalone application. In some other embodiments, migration-client module 26 may coexist with other services such as firewall applications, server loadbalancer applications, etc. A migration manager 28 may be provisioned in each of aggregation router/switch 12A and 12B. Migration manager 28 may determine that an FD (or service node) should be disengaged (e.g., taken off-line), for example, to power down the node, for maintenance and repairs, for service upgrades, etc. Assume, for the sake of illustration, that FD 14A is to be disengaged. According to embodiments of the present disclosure, migration-client module 26 of FD 14A receives instructions from migration manager 28 to gracefully disengage FD 14A out of the cluster group without data path disruption (i.e., packet loss). Data path disruption may occur when one or more packets traversing a network do not reach their intended destination.

In various embodiments, migration-client module 26 may select an inheritor, which is a peer node such as FD 14B, and may duplicate flows from FD 14A to inheritor FD 14B. As used herein, a "peer node" includes a node at the same layer in the network. For example, in cluster 18, FD 14A is a peer node of FD 14B, and service node 16A is a peer node of service nodes 16B-16D. Subsequently, migration-client module 26 may inform migration manager 28 that FD 14A has been successfully disengaged. Migration-client module 26 may also broadcast (i.e., transmit to all peer nodes on cluster 18) FD 14B's new status (as inheritor from FD 14A) to other peer nodes in cluster 18, as needed. In some embodiments, the broadcasting may be performed through aggregation router/switch 12A and 12B. In other embodiments, the broadcasting may be performed among all peer nodes at the target node's layer. Migration manager 28 may then forward or redirect packets to the inheritor (i.e., FD 14B) and disengage FD 14A from the cluster. Returning packets in the flow (e.g., from downstream servers) would be redirected automatically to the inheritor, which would then own the flow. Note that a returning packet (e.g., in a server response) is treated as belonging to the same flow as the incoming packet.

For purposes of illustrating certain example techniques of communication system 10, it is important to understand the communications that may be traversing the network. The following foundational information may be viewed as a basis from which the present disclosure may be properly explained. Such information is offered earnestly for purposes of explanation only and, accordingly, should not be construed in any way to limit the broad scope of the present disclosure and its potential applications.

In network communication, pieces of information called packets are exchanged between devices. A packet is a sequence of octets (i.e., 8 bits) and generally consists of a header followed by a body. Typically, the header describes the packet's destination and, optionally, the routers to use for forwarding until it arrives at its destination. Typically, the body contains the data being transmitted (i.e., the payload). In a typical TCP connection, a server creates a listener socket waiting for remote clients to connect. A client can issue a connect( ) socket function to start the TCP handshake. The client can send a SYN packet (e.g., setting the segment's sequence number to a random value A). The server responds with a SYN-ACK packet (e.g., setting an acknowledgment number to one more than the received sequence number (A+1), and the sequence number that the server chooses for the packet is another random number, B). The client responds with an ACK (e.g., setting the sequence number to the received acknowledgement value (i.e., A+1), and the acknowledgement number to one more than the received sequence number (i.e., B+1)). The server issues the accept( ) socket function to accept the connection request. The client and server issue read( ) and write( ) socket functions to exchange data over the socket. At the end of the transmission, either the server or the client decides to close the socket with a TCP closure sequence (a FIN packet followed by an ACK packet).

TCP/IP communication can be managed in terms of packets, or alternatively, in terms of flows. A flow is a stream of related packets that meet the same matching criteria and that share the same characteristics. For example, a flow includes a stream of packets between a particular source address and a port going to a unique destination address and port, where all such packets use the same protocol. An individual flow might be a voice call, a video call, a file transfer, a web access, etc. Identification of a flow may depend on the actual implementation. For example, a flow may be identified solely by the destination address, or it may be identified by a triplet that includes source address, destination address, and protocol. Alternately, a packet's flow may be identified by some or all of the following five tuple: (1) source address; (2) destination address; (3) source port; (4) destination port; and (5) protocol.

Turning to server clusters, two or more interconnected servers can create the appearance of a virtual resource, which enhances various server and network parameters (e.g., server availability, scalability, etc.). Clusters are usually deployed to improve performance and availability in comparison to a single device (e.g., computer, server, storage device, etc.). Clusters may include high-availability clusters (e.g., for improving the availability of services that the cluster provides), loadbalancing clusters (e.g., for sharing computational workload or functions over a cluster), etc. Server clusters may be configured for availability, for scalability, or for other configuration goals.

In general, clusters have a common objective of combining multiple processors to appear as a unified high-performance system using special software and high-speed network interconnects. In an example, server clusters can support more users at a current level of performance (or improve performance for a current number of users) by sharing the computational workload across multiple servers. Server clustering can enable applications to handle more load and avoid service interruptions. The virtual unified computing resource presented by a server cluster empowers IT personnel with more choices to configure the infrastructure (e.g., to support application performance, availability, scalability requirements, etc.).

Server clusters have historically been associated with university research, scientific laboratories, and military research for unique applications, such as: meteorology (e.g., weather simulation); seismology (e.g., seismic analysis); military research (e.g., weapons, warfare), etc. Server clusters are also applied in enterprises to a broad range of applications, such as financial trending analysis (e.g., real-time bond price analysis and historical trending); film animation (e.g., rendering of artist multi-gigabyte files); manufacturing (e.g., automotive design modeling and aerodynamics); and search engines (e.g., quick parallel lookup plus content insertion, etc.).

In a two-stage server cluster, a flow (e.g., defined by the source and destination nodes) may be evenly distributed across multiple two-hop paths from ingress to egress, with some nodes in the network acting as flow-packet distributors. The routing can be performed in two-stages, and each packet traverses a first path from the ingress node to an arbitrary FD, and a second path from the FD to the egress node. The first path routing may be based on a hashing algorithm (to randomly spray the packet to any available FD), and the second path routing may be flow-based, which ensures flow integrity.

The hashing algorithm may be implemented on hardware (such as application specific integrated circuits (ASICs), or network processors). In some implementations, the algorithm is deterministic; if the same addresses (e.g., source addresses and/or destination addresses) are used, the resulting hash may be to the same port in the communication channel. This strategy prevents out-of-order packet delivery. For example, one hashing algorithm may translate a five tuple consisting of five flow parameters (e.g., (1) source address; (2) destination address; (3) source port; (4) destination port; and (5) protocol) into a hash and spray the traffic to FDs in the cluster. The hash value can be used to select the link for forwarding the packet. For example, all hardware switching within a particular flow (such as a TCP connection) may be routed to the same next hop, thereby reducing the chance of packet reordering or packet loss.

In another example, the source IP address and source port of the incoming packet may be converted to a host identification (ID), which is matched to the calculated host ID of the nodes in the cluster. All the nodes may execute the hashing algorithm in parallel. The node with the host ID that matches the hash may accept the packet, while the other nodes may drop the packet. In yet another example, the hashing algorithm may be based on source and destination IP address (for IP interfaces), and source and destination Media Access Control (MAC) address (for non-IP interfaces). In yet another example, the hashing algorithm may use one or more of the following parameters: destination MAC address; source MAC address; source and destination MAC addresses; destination IP address; source IP address; source and destination IP addresses; source TCP/UDP port number; destination TCP/UDP port number; and source and destination TCP/UDP port number. Various methods exist for determining the hashing algorithm and associated parameters, where any such methodologies and different parameters are included within the broad scope of the present disclosure. The actual parameters to be used in the hashing algorithm may be selected by the user as appropriate and based on particular needs.

The hashing algorithm implemented in hardware is capable of certain high-speed activities; however, other network traffic processing (e.g., flow persistence, deep packet inspection, etc.) may not be performed as efficiently. Moreover, for applications that require that all packets in a flow be sent to the same node, a hashing strategy may not be effective. For example, a return packet may have a different source and destination address than the original packet. The hash of the source and destination address may lead to a different number than the one calculated for the original packet. Hence, the return packet may be routed to a different node, according to the hashing algorithm, leading to potential disruption of the application. Hence, a second stage involving flow forwarding may be implemented to route the packets to their proper destination nodes.

The flow-packet distribution may be implemented in software. The distribution can be based on a flow, where a single flow would not be distributed and would only use one link. The flow forwarding software may be provisioned in any FDs or service nodes in the cluster. Configuration settings of the packet (such as security policies, Application Layer Gateway (ALG), Network Address Translation (NAT) settings, etc.) are assessed for the first packet of a flow. The settings are then applied to the rest of the packets in the flow.

To determine if a packet belongs to a particular flow, the FD matches the packet's information to that of an existing flow-based on the following five match criteria: (1) source address; (2) destination address; (3) source port; (4) destination port; and (5) protocol. Other matching criteria may also be used as appropriate and based on particular needs. If the packet matches an existing flow, processing for the packet is assessed in the context of its flow table (i.e., a logical set of entries comprising keys (e.g., fields, parameters, etc.) and various instructions to apply to packets that match the keys). For example, the FD may check whether it is the owner of the packet's flow (e.g., the FD may be the owner if it can access the packet's flow table). If it is not the owner, the FD may determine the true owner (e.g., using appropriate flow forwarding software, such as the Cisco® Strike Eagle), and forward the packet to the true owner (which may be a peer node on the network). If the packet does not match an existing flow, the packet is used to create a new flow table.

Turning to the elastic capacity of applications, server clustering is an effective tool to achieve this objective. For example, if a server becomes unavailable (for any reason, such as failure or planned downtime, etc.), another server in the cluster can assume the workload, thus transparently avoiding loss of service to the users or applications that access the cluster. Elastic capacity of applications may be desired for various reasons. For example, the required capacity of an application can be time-based (e.g., full capacity during daytime, half capacity during nighttime). In another example, to save energy, the user may seek to shut down some servers during off-peak time. In yet another example, a system upgrade may require an application server to reboot. If a member server is shut down, rebooted, or otherwise disengaged from the cluster, data path disruptions may occur. For example, many applications such as Cisco® Adaptive Security Appliances (ASA), Cisco Wide Area Application Services (WAAS), etc., require flow affinity in a cluster environment. For such applications, all packets have to be sent through, or to, a single application server. If the application server is taken off-line from the cluster, the packets may be lost.

Mechanisms for flow replication and migration exist in current flow-based clustering designs. For example, service providers routinely do non-disruptive flow migration, for example from one aggregation switch to its peer node before upgrading or maintaining the aggregation switch, usually by withdrawing the route via the switch. However, such schemes are designed more for a fast failure-recovery than a zero-packet-drop solution desired in the case of a planned node removal. Moreover, packets in the server's downstream path may seek to return by the same path (e.g., via the member that is removed): resulting in packet drops when the member is removed.

Generally, in server cluster designs, performance is preeminent; little consideration has been given to how to shut down nodes (e.g., almost idle servers, etc.) without packet drops. For example, a certain currently available service appliance design has a high-power consumption even when there is no packet to handle, where such consumption is due to a busy polling mechanism. Customers may desire to automatically shut down idle servers, while minimizing any potential packet drops. Note that certain technology can migrate a virtual machine (VM) from one physical server to another in an environment, where the physical server appears as multiple VMs. However, similar solutions do not exist in the physical server space, where multiple physical servers act as one.

A system for non-disruptive management of servers in a network environment, illustrated in FIG. 1, can resolve many of these issues. Embodiments according to the present disclosure may provide for non-disruptive management of server capacity, power, and maintenance. In a two-stage clustering environment combining hash-based and flow-based packet forwarding, migration manager 28 and migration-client module 26 can gracefully migrate flows from a departing server to an active server before the departing server is cut off from the cluster. In a non-VM clustering environment, embodiments of the present disclosure can manage server capacity, power management, and system maintenance in a non-disruptive manner. In various embodiments, a module-based chassis or a cloud-operating system (e.g., a cloud-based network) can deploy the adaptive management scheme, as described herein, to achieve an optimum use of capacity/power and, further, provide anytime system maintenance with no packet drop.

In various embodiments, migration-client module 26 is installed in substantially every node in the cluster. In some embodiments, migration-client module 26 is installed only in FDs 14A and 14B. In various embodiments, migration manager 28 may be a software component that instructs migration-client module 26 to remove a target node (i.e., node to be disengaged from cluster 18), such as FD 14A. Flow tables (and other application states, as appropriate) of FD 14A may thereupon be redistributed to selected inheritors (which are nodes that replace the target node), such as FD 14B. Peer nodes in the cluster may be informed that FD 14B is the new owner of flows previously belonging to FD 14A. A message may be sent to migration manager 28 to remove FD 14A from its forwarding engine 19 (e.g., portchannel, WCCP group, etc.). Subsequently, aggregation router/switch 12A and 12B may not forward any new packets to FD 14A. FD 14A can then be shut down, decommissioned, etc., as appropriate.

Substantially all peer nodes may have access to lookup tables (or other logical databases) indicating ownership of respective flow tables. For example, metadata from the flows may be stored in a lookup table in one or more of switches 12A or 12B. When a packet arrives at a node (e.g., FD 14A), the node may attempt to access its stored flow table. If the packet's flow cannot be accessed, FD 14A may read the lookup table to determine the true owner (e.g., FD 14B), and forward the packet to the true owner (e.g., FD 14B).

In various embodiments, the schemes described herein may be implemented for removing a node from the second layer (comprising FDs) in cluster 18. In embodiments where FDs and service nodes are provisioned in the same device (e.g., an ASA), the schemes described herein may be implemented for both the FD and the service node component. In embodiments where FD and the service node are in separate devices, the schemes described herein may additionally be applied for service nodes if migration manager 28 and the service node are configured to send messages to each other (e.g., Agni, charging control node (CCN) XMPP).

Turning to the infrastructure of FIG. 1, in some embodiments, migration manager 28 may be provisioned on a supervisor engine in a service module chassis. Supervisor engines are management applications that can provide centralized forwarding information and processing, among other functions. Supervisor engines include a policy feature card (PFC), which is a forwarding plane that performs Layer 2 and Layer 3 forwarding, enforces access control list (ACL) functions and performs policing and marking for quality of service (QoS) traffic; and a multilayer switch feature card (MSFC), which is a control plane that performs routing for the chassis. The MSFC can include a route processor (RP) and a switch processor (SP) for the router and, further, can run Layer 2 and Layer 3 protocols.

In other embodiments, migration manager 28 may be provisioned inside a CCN control point. A CCN is a signaling control point used in a communication network that can receive and process, track, and rate packet data service and content usage requests. A CCN can be configured to find and communicate with a service data point (SDP), perform session control, etc. According to embodiments of the present disclosure, migration manager 28 may be driven by the user's configuration (e.g. time-based server addition/removal) or by the application usage, or other factors.

In various embodiments, migration-client module 26 and migration manager 28 may be implemented in software. The software may have associated application programming interface (API), command line interfaces (CLI), graphical user interfaces (GUI), or other suitable user interfaces as appropriate and based on particular needs. The software may be standalone applications, or integrated with other applications, such as server management application, routing application, etc. Migration-client module 26 and migration manager 28 may also be implemented in firmware (software integrated into hardware).

Various designs for the network of communication system 10 are possible. In general, communication system 10 may include: commodity off the shelf (CotS) server hardware; GigE or 10 GigE network interface cards (NICs); low latency hardware; non-blocking or low-over-subscribed switch fabric; mesh/partial mesh connectivity (e.g., server cluster designs usually require a mesh or partial mesh fabric to permit communication between all nodes in the cluster, where the mesh fabric can be used to share state, data, and other information between master-to-compute and compute-to-compute servers in the cluster); jumbo frame support, etc.

Aggregation router/switch 12A and 12B may offer administrative privileges (e.g., a human administrator, an administrator software, an administrator communication channel such as a control plane, etc.). In some embodiments, a human administrator may configure aggregation router/switch 12A and 12B for various functions, such as node removal, load-balancing, etc. The human administrator can choose configurations for various functions using a CLI. For example, aggregation router/switch 12A and 12B may have portchannels with several loadbalancing factors to choose from (e.g., hashing algorithm based on source IP address, destination IP address, or both, etc.). The human administrator can choose the appropriate factors using the CLI (e.g., a command on Cisco Nexus 7000 switch for the hashing algorithm may be: NXOS: (config)# port-channel load-balance ethernet {various options} [module]).

In another example, the human administrator can enter appropriate commands to instruct FD 14A to be disengaged from the cluster (e.g., commands on Cisco Nexus 7000 switch may include manage-lb-pool remove-node (-p pool_id|-n name)—node address:port; or manage-lb-pool deactivate-node (-p pool_id|-n name)—node address:port; etc.). In one example embodiment, a first vendor may manage aggregation router/switch 12A and 12B, and a second vendor may manage different nodes (e.g., FD 14A and FD 14B). The second vendor may inform the first vendor that FD 14A is to be removed from the cluster. The first vendor may facilitate graceful removal of FD 14B through appropriate manual commands (using CLI as suited).

Aggregation router/switch 12A and 12B may be provisioned with forwarding engines 19 comprising ASICs configured to perform hash-based packet forwarding. In various embodiments, forwarding engine 19 may provide Ethernet bridging at Layer 2, IP routing at Layer 3 and other capabilities. In one embodiment, forwarding engine 19 may be specifically configured to forward packets using a combination of hardware and software. The packets may be hardware switched (e.g., at high rates), and any exception packets (e.g., packets that arrive with non-supported encapsulation layers, 802.3 Ethernet packets, etc.) may be forwarded to associated software for further processing. In an example embodiment, forwarding engine 19 may comprise a data plane of a router, including a routing table that may be looked up to determine destination addresses of incoming packets, paths for transmission, etc., a forwarding information base that may be used to find the proper interface to send an outgoing packet, and other logical components.

In some embodiments, the node to be removed (e.g., FD 14A) may send a control plane message to aggregation router/switch 12A and 12B. Aggregation router/switch 12A and 12B may determine from the message that FD 14A may be removed from the forwarding channel (e.g., medium to forward packets from one layer to another layer). Control plane messages may use a control channel to aggregation router/switch 12A and 12B. In an example embodiment, a vendor may manage both aggregation router/switch 12A and 12B and FDs 14A and 14B. In such a scenario, FDs 14A and 14B may communicate with aggregation router/switch 12A and 12B via control planes. Automated messages via the control planes may be facilitated in such embodiments to permit graceful removal of FD 14A from the cluster.

The network infrastructure of FIG. 1 may comprise 10 Gigabit Ethernet (GigaE), Gigabit Ethernet, or Etherchannel channels, along with appropriate Layer 2 and Layer 3 interfaces as needed. Redundancy may be built into the network, for example, using redundant Layer 3 10 GigE links, redundant nodes, etc. Separate cores may be implemented to isolate distribution or aggregation layers in terms of administration and policies (e.g., quality of service, access lists, troubleshooting, maintenance, etc.) Components of communication system 10 may sit within a data center and provide services to enhance server and application availability, security, etc. In one embodiment, aggregation router/switch 12A and 12B may include Cisco Nexus aggregation routers/switches. In another embodiment, FDs 14A and 14B and service nodes 16A-D may comprise an application control engine (ACE) including parallel network-processor based architecture with separate control and data paths, switch fabric interface, appropriate control planes and data planes with route managers, interface managers, etc.

Figure 2:
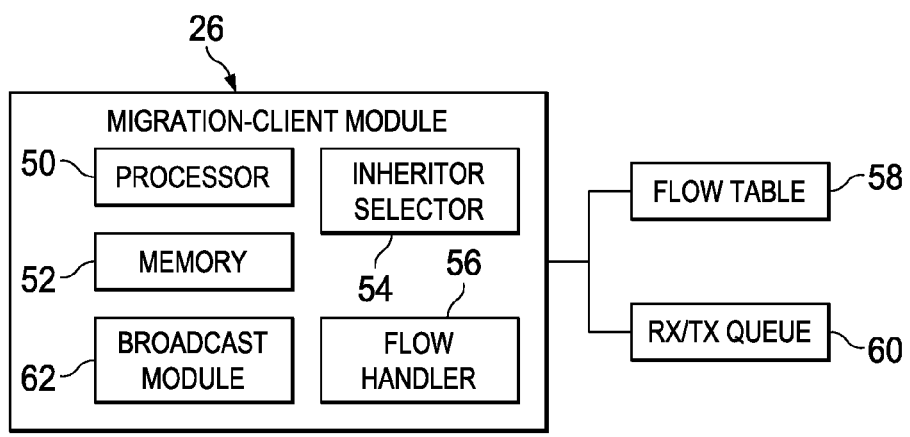
FIG. 2 is a simplified block diagram illustrating additional details of the communication system.

Turning to FIG. 2, FIG. 2 is a simplified block diagram of an example implementation of migration-client module 26. According to an embodiment of the present disclosure, migration-client module 26 includes a processor 50, a memory 52, an inheritor selector 54, and a flow handler 56. Flow handler 56 may read or create a flow table 58, and read or populate a receive/transmit (RX/TX) queue 60. Migration-client module 26 also includes a broadcast module 62.

In various embodiments, flow table 58 is stored in memory 52 and RX/TX queue 60 is stored on a network interface card (NIC). NIC implements any electronic circuitry required to communicate in the network, for example, using a specific physical layer and data link layer standard such as Ethernet, WiFi, or Token Ring, etc. NIC allows communication among small groups of computers on the same local area network (LAN) and large-scale network communications through routable protocols, such as TCP/IP. The NIC may be a standalone card, or it may be integrated into a motherboard of the router or server. The NIC may have suitable memory (e.g., static random access memory SRAM) to store flow table 58 and RX/TX queue 60. In one embodiment, memory 52 and processor 50 may be provisioned on the NIC, and flow table 58 and RX/TX queue 60 may be stored in memory 52.

In operation, inheritor selector 54 is configured to select one or more inheritors of the target node. In an example embodiment, a single inheritor may be selected. In another embodiment, one inheritor and a back-up inheritor may be selected. In yet another embodiment, several peer nodes may be selected as inheritors. In yet another embodiment, substantially all nodes in the cluster may be selected as inheritors. Inheritor selector 54 may use any suitable algorithm for selecting an inheritor. In one embodiment, inheritor selector 54 selects an inheritor that is least busy, as determined by the number of flow table entries in respectively accessible flow tables. In another embodiment, inheritor selector 54 may randomly select a peer node as the inheritor.

According to yet another embodiment, each migration-client module 26 may inform migration manager 28 of flow handling statistics of respective FDs (e.g., FD 14A and FD 14B). Flow handling statistics may include the number of flows handled by each peer node (e.g., FDs). Migration manager 28 may forward the flow handling statistics to migration-client module 26 of the target node (e.g., FD 14A). Migration-client module 26 of the target node may distribute the flows among the peer nodes based on the flow handling statistics so that the total flows handled by the peer nodes are evenly distributed. For example, assume that FD 14A has three peer nodes: each handling 25% of the current flows. Migration-client module 26 of the target node may spread the target node's flow table 58 equally across each peer node. Thus, all peer nodes may become inheritors of the target node for an even portion of the target node's flows. In yet another embodiment, the inheritor may be manually selected. For example, an administrator may insert a new FD to replace the target node (e.g., to upgrade the target node, while the rest of its peers are busy). The administrator may force migration-client module 26 of the target node to specify the new FD as the inheritor (e.g., to replace the target node during its upgrade/maintenance). In yet another embodiment, the new FD may be automatically selected by migration-client module 26 of the target node, as it may have the least number of flows in the network.

Flow handler 56 is configured to migrate flows from a target node to one or more inheritors. In one embodiment, flow handler 56 performs the migration by duplicating flow table 58 to the selected inheritors. After contents of flow table 58 have been duplicated to the inheritors, flow table 58 is purged (i.e., emptied). The target node can be disengaged from the cluster after flow table 58 is emptied. Broadcast module 62 may inform migration manager 28 on the forwarding switch (e.g., aggregation router/switch 12A) that the target node is being removed from the cluster. The switch (e.g., aggregation router/switch 12A) may subsequently stop forwarding any packets to the target node. Flow handler 56 inspects flow table 58 and RX/TX queue 60 for two-way network traffic being queued therein, for example, to determine whether any packets are awaiting processing. When RX/TX queue 60 is empty, broadcast module 62 may broadcast the status of the inheritor to peer nodes on the cluster.

Figure 3:
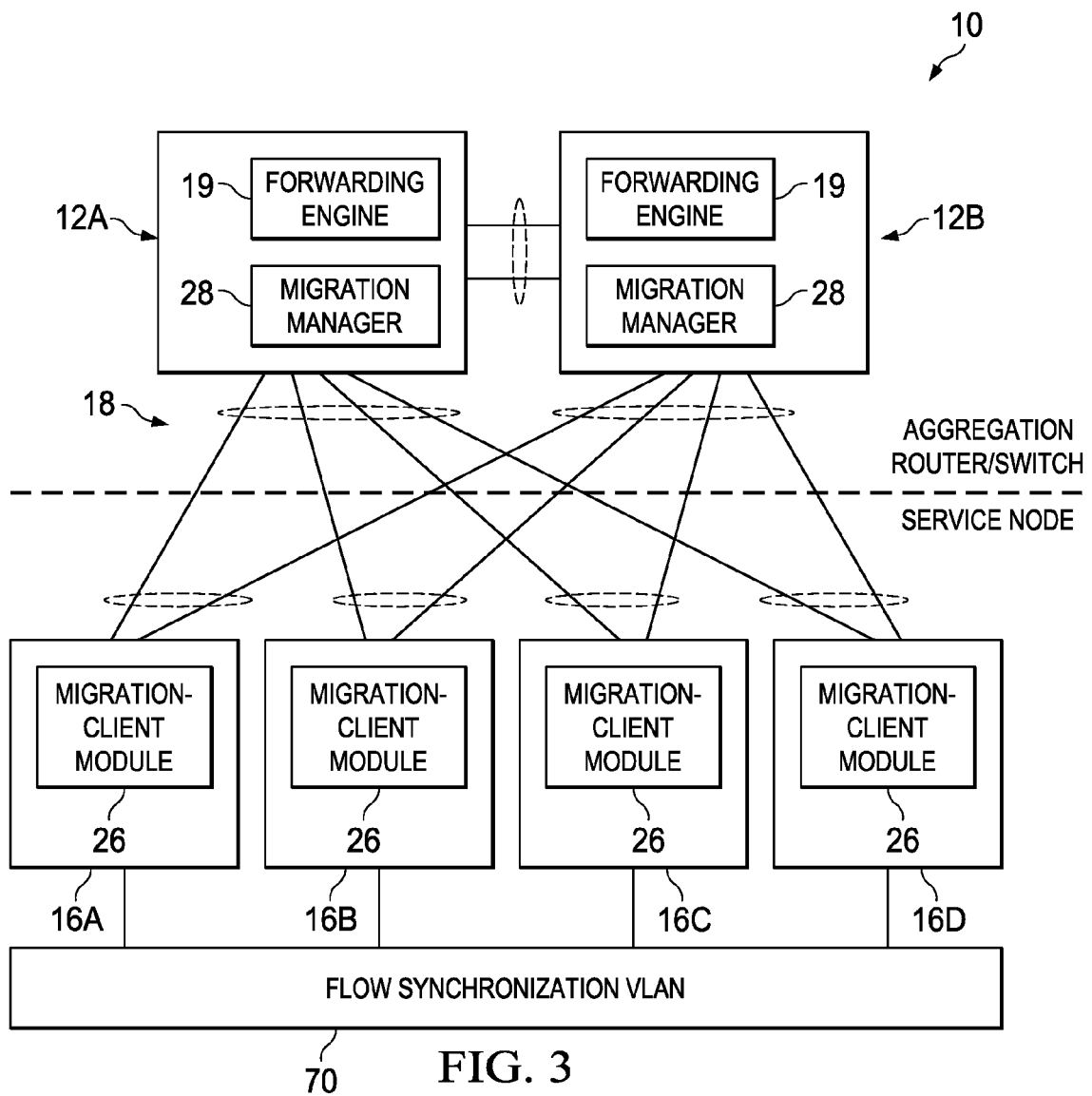
FIG. 3 is a simplified diagram of another embodiment of the communication system.

Turning to FIG. 3, FIG. 3 is a simplified block diagram of another embodiment of communication system 10. The network design of cluster 18 may include two layers, with the first layer comprising aggregation router/switch 12A and 12B, and a second layer comprising service nodes 16A-D. Service nodes 16A-D may connect to (and provide services to) a virtual local area network (VLAN) 70 with flow synchronization. Functionalities of FDs may be integrated into service nodes 16A-D. Network traffic between the first layer and the second layer may use a hashing algorithm scheme. Network traffic in the second layer (and from the second layer to VLAN 70) may use a flow-based packet-forwarding scheme.

Migration manager 28 and forwarding engine 19 may be provisioned in each of aggregation router/switch 12A and 12B. Forwarding engine 19 may implement hash-based packet forwarding. Migration-client module 26 may be provisioned in each of service nodes 16A-D. In various embodiments, service nodes 16A-D may comprise security appliances, such as Cisco Adaptive Security Appliances (ASA). Service nodes 16A-D may execute various services, such as firewall, content security (e.g., antivirus, antispyware, etc.), IPsec, SSL VPN, intrusion prevention, etc. Migration-client module 26 may run on service nodes 16A-D as part of the various other services.

Migration manager 28 of aggregation router/switch 12A may inform a service node (e.g., service node 16A) that it is being removed. Migration-client module 26 of service node 16A may select a suitable inheritor (e.g., service node 16B) and a back-up inheritor (e.g., service node 16C) and duplicate flow tables from service node 16A to service nodes 16B and 16C. Migration-client module 26 may broadcast the migration to other peer nodes (e.g., service node 16D) and inform aggregation router/switch 12A of the removal. Aggregation router/switch 12A and 12B may communicate the migration information amongst each other. Migration-client modules 26 may stop forwarding packets to service node 16A and instead route packets to service node 16B.

Figure 4:
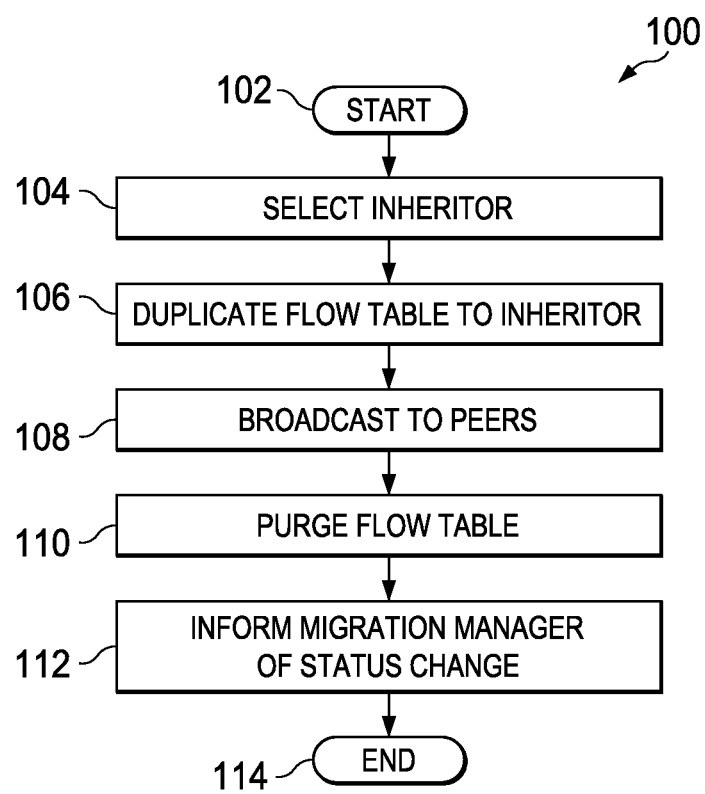
FIG. 4 is a simplified flow diagram illustrating example operational activities that may be associated with embodiments of the communication system.

Turning to FIG. 4, FIG. 4 is a simplified flow diagram illustrating operational activities that may be associated with communication system 10. Operation 100 begins at 102 when migration-client module 26 is informed of removal of its associated target node. At 104, inheritor selector 54 of migration-client module 26 may select an appropriate inheritor from among the peer nodes. At 106, flow handler 56 of migration-client module 26 may duplicate flow table 58 to the inheritor(s). At 108, broadcast module 62 may broadcast the new ownership of migrated flows to peer nodes. At 110, flow handler 56 may purge flow table 58. Migration-client module 26 may wait for flow table 58 to be empty and no packet is pending in RX/TX queue 60 before informing migration manager 28 of the status change of the target node and inheritor at 112. In one embodiment, migration-client module 26 may send a message to migration manager 28 to remove the target node from forwarding engine 19 associated with migration manager 28. The operations end at 114, and migration manager 28 may cause subsequent packets to be forwarded to the inheritor.

Figure 5:
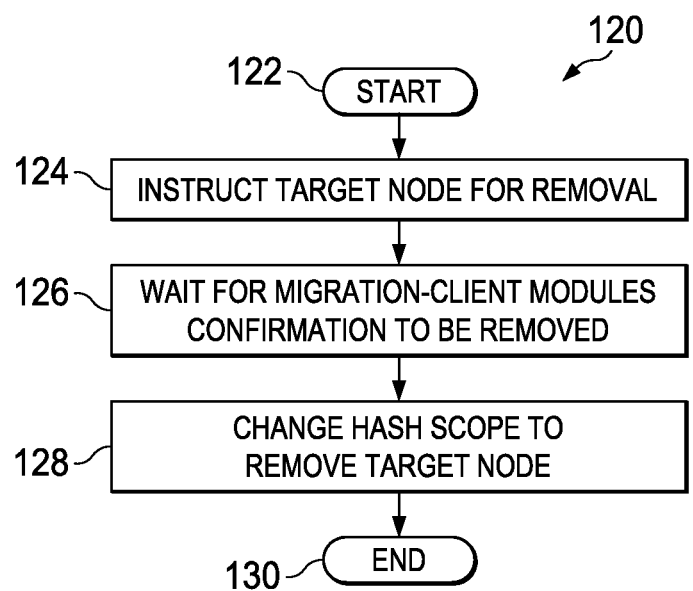
FIG. 5 is a simplified flow diagram illustrating example operational activities that may be associated with embodiments of the communication system.

Turning to FIG. 5, FIG. 5 is a simplified flow diagram illustrating example operational activities that may be associated with embodiments of the present disclosures. Operations 120 begin at 122, when communication system 10 is activated. At 124, migration manager 28 (e.g., in aggregation router/switch 12A) instructs a target node (e.g., FD 14A) for removal. In one embodiment, the instruction may be communicated to migration-client module 26 in the target node. At 126, migration manager 28 waits for confirmation from migration-client module 26 for the target node to be removed. At 128, upon receiving the confirmation from migration-client module 26, migration manager 28 may change a hash scope (e.g., in a hashing algorithm) to remove the target node from further flow distribution. For example, changing the hash scope may result in the target node's information, such as IP address or ports, being removed from the hashing algorithm. The process ends at 130.

Turning to FIG. 6, FIG. 6 is an example of a plurality of flow table entries 140 according to an embodiment of the present disclosure. In various embodiments, flow table entries 140 may be implemented in an architecture comprising a two-stage server cluster. For example, the first stage can include spraying the packets randomly using a hashing algorithm, and the second stage can include flow-based distribution. Assume, for purposes of discussion only and in connection with FIG. 5 through FIG. 8, that migration manager 28 on aggregation router/switch 12A instructs migration-client module 26 on FD 14A to be disengaged and migration-client module 26 of FD 14A selects FD 14B as the inheritor. In embodiments, where cluster 18 comprises only two layers, assume that migration manager 28 on aggregation router/switch 12A instructs migration-client module 26 on service node 16A to be disengaged and migration-client module 26 selects service node 16B as the inheritor.

In the embodiment according to the FIGURE, flow table entries 140 include a key, which may be defined by the source IP, source port, destination IP, destination port and protocol of the packets of the flow; action_network, which may include any network action to be performed on the packets of the flow; and action_application, which may include actions specified by the application communicating the packets of the flow. In other embodiments, the key may alternately include a subset of the five factors (source IP, source port, destination IP, destination port, protocol, or a suitable combination thereof), based on the flow definition of the network.

In various embodiments, network actions include forward (e.g., packets is passed through the node without any processing), rewrite (e.g., the packet is manipulated to rewrite some parts of the header, such as destination IP address, MAC address, or port, etc., for a suitable purpose such as loadbalancing, or translating to a different network, etc.); or redirect (e.g., the packet is forwarded to the true owner). Application actions can vary with the particular application communicating the packets. For example, the packet may be compressed, decompressed for deep packet inspection, encrypted, decrypted, or cached (e.g., a copy of the packet is saved into a network node for fast access), etc. The flow table entries (e.g., key, action_network, action_application) described herein are for example purposes only and are not intended to be limitations. Various other flow table entries may also be used within the broad scope of the present disclosure.

Turning to FIG. 7, FIG. 7 is a simplified algorithm 150 for non-disruptive migration according to embodiments of the present disclosure. Algorithm 150 may be implemented by migration-client module 26 on FD 14A (or service node 16A as appropriate). Algorithm 150 includes: (1) calling function flow_migrate( ) (2) instructing to remove the member (i.e., FD 14A) from forwarding engine 19 on aggregation router/switch 12A; (3) waiting until flow table 58 of FD 14A is empty and no packets are pending in RX/TX queue 60 (which may be stored on an NIC in FD 14A); and (4) setting the memberStatus of FD 14A to "DISCHARGED FROM CLUSTER" or other value indicating that the target node is disengaged from cluster 18.

In one embodiment, calling the flow_migrate( ) function may be through a manual CLI step on aggregation router/switch 12A. In another embodiment, calling the flow_migrate( ) function may be through an automated message to aggregation router/switch 12A via an API on a control plane. In one embodiment, the memberStatus may be communicated to an upper level control plane via the API. In another embodiment, the memberStatus may be displayed on the CLI of aggregation router/switch 12A. Alternately, or additionally the memberStatus may be displayed on appropriate graphical user interfaces associated with migration manager 28 of aggregation router/switch 12A. Once the memberStatus has been set to "DISENGAGED FROM CLUSTER," the upper control point management software or the user can safely remove FD 14A from the network.

Turning to FIG. 8, FIG. 8 is a simplified algorithm 160 for migrating flows from a target node to an inheritor according to embodiments of the present disclosure. According to the embodiment of the FIGURE, variable myInheritor, which can define the inheritor (i.e., FD 14B according to the example) of the target node (i.e., FD 14A according to the example), is set to the member that has the least number of flows. The member that has the least number of flows is likely to be least busy, and probability of packet drop by such member may be consequently low. In other embodiments, myInheritor may be set according to IP addresses of the peer nodes (e.g., nearest IP address, etc.), or other parameters as appropriate based on particular needs. Flow_migration is then turned on. Flow table 58 of FD 14A may be copied to myInheritor's (i.e., FD 14B's) flow table 58. Copying may be accomplished by point-to-point communication between the target node (i.e., FD 14A) and the inheritor (i.e., FD 14B). Then, migration-client module 26 of FD 14A may broadcast to peer nodes that myInheritor (i.e., FD 14B) is the owner of all the flow table entries in flow table 58. Flow table 58 is then purged to remove all flow table entries 140.

Turning to FIG. 9, FIG. 9 shows an example flow-handling algorithm 170 according to an embodiment of the present disclosure. Assume, for the sake of illustration, that a packet, packet_a, traverses the two-stage cluster of communication system 10. If flow migration is turned on, the packet is redirected by migration-client module 26 to inheritor 14B. Flow migration is turned on if packet_a arrives at FD 14A after migration manager 28 of aggregation router/switch 12A has instructed migration-client module 26 of FD 14A to disengage FD 14A from the cluster, and before FD 14A has been completely disengaged from the cluster.

If flow migration is not turned on (indicating that FD 14A is not being disengaged from the cluster), FD 14A may process packet_a according to existing methodologies. For example, if packet_a is a SYN packet, it may indicate a new flow. A new flow_a may be created. Flow_a's action may be prescribed according to the network service (e.g., forward, or redirect, or rewrite, etc.). Packet_a may be processed according to the prescribed action. Next, reverse_flow_a (which is the flow of packet_a in its return path in the same communication session) is defined, as also the corresponding action. In an embodiment, reverse_flow_a is defined by swapping the source and destination addresses in the packet header of packet_a. Some applications may have a flow persistence requirement; incoming packet and returning packet should belong to the same flow (and flow table). Flow_a and reverse_flow_a are inserted into flow table 58. FD 14A broadcasts to its peer nodes that it is the owner of flow_a and reverse_flow_a. The packet is then processed and forwarded according to its destination.

If packet_a matches flow_a, which has a different owner (e.g., FD 14B), then FD 14A may redirect packet_a to FD 14B. Separately, if packet_a is not a SYN packet, indicating an existing flow_a, and FD 14A is the owner of flow_a, FD 14A may then process packet_a according to the prescribed (or matched) action as per flow_a in FD 14A's flow table 58. Packet_a may be forwarded to its destination. If the packet is a FIN/RST packet, indicating end of flow, flow_a may be removed from flow table 58.

In example embodiments, at least some portions of the activities outlined herein may be implemented in non-transitory logic (i.e., software) provisioned in, for example, nodes (e.g., FDs 14A and 14B and/or aggregation router/switch 12A and 12B). This can include one or more instances of forwarding engine 19, migration manager 28, migration-client module 26, and/or inheritor selector 54 being provisioned in various locations of the network. In some embodiments, one or more of these features may be implemented in hardware, provided external to these elements, or consolidated in any appropriate manner to achieve the intended functionality. Aggregation router/switch 12A and 12B, FDs 14A and 14B, and/or service nodes 16A-D may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, components of communication system 10 described and shown herein may also include suitable interfaces for receiving, transmitting, and/or otherwise communicating data or information in a network environment. Additionally, some of the processors and memory associated with the various nodes may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory (e.g., memory associated with migration-client module 26) can store data used for the operations described herein. This includes the memory being able to store instructions (e.g., software, logic, code, etc.) that are executed to carry out the activities described in this Specification. A processor can execute any type of instructions associated with the data to achieve the operations detailed herein in this Specification. In one example, one or more processors associated with migration-client module 26 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components in communication system 10 can include one or more memory (e.g., memory associated with migration-client module 26) for storing information to be used in achieving operations as outlined herein. These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

Note that with the numerous examples provided herein, interaction may be described in terms of two, three, four, or more nodes. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of nodes. It should be appreciated that communication system 10 of the FIGURES and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," "optimum," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols in which packets are exchanged in order to provide mobility data, connectivity parameters, access management, etc. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   disengaging a target node from a cluster comprising a first layer of a network topology that implements hash-based packet forwarding, and a second layer of the network topology that implements flow-based packet forwarding, wherein the disengaging comprises:
   selecting an inheritor;
   duplicating a flow table from the target node to the inheritor, wherein the flow table comprises a set of entries including flow keys identifying flows and corresponding actions to be performed on packets matching the flow keys;
   migrating flows from the target node to the inheritor;
   informing a migration manager that the target node is disengaged from the cluster; and
   broadcasting to peer nodes of the target node that the target node is replaced by the inheritor.

2. The method of claim 1, wherein the first layer of the network topology includes a forwarding engine and the second layer of the network topology comprises the target node and the inheritor.

3. The method of claim 1, wherein the cluster further comprises:
   a third layer including service nodes configured for packet processing in a network.

4. The method of claim 1, wherein the inheritor comprises a peer node of the target node having a least number of flows within a subset of nodes of the cluster.

5. The method of claim 1, wherein the inheritor comprises a new peer node in the cluster.

6. The method of claim 1, wherein selecting the inheritor comprises:
   receiving flow handling statistics of peer nodes from the migration manager; and
   distributing the flows among the peer nodes based on the flow handling statistics so that a total number of flows being handled by the peer nodes are evenly distributed.

7. The method of claim 1, wherein the target node comprises a flow-packet distributor.

8. The method of claim 1, further comprising:
   purging the flow table;
   identifying that the flow table is empty and no data packet is pending in a receive/transmit (RX/TX) queue of the target node; and
   setting a status of the target node to indicate that the target node is disengaged from the cluster.

9. The method of claim 1, further comprising:
   redirecting a packet from the target node to the inheritor.

10. The method of claim 1, further comprising:
    providing instructions for a removal of the target node;
    identifying a confirmation that the target node is removed; and
    changing a hash scope in a hashing algorithm to remove the target node.

11. An apparatus, comprising:
    a memory configured to store instructions;
    a processor operable to execute the instructions;
    an inheritor selector module;
    a flow handler; and
    a broadcast module, wherein the apparatus is configured for:
    disengaging a target node from a cluster comprising a first layer of a network topology that implements hash-based packet forwarding, and a second layer of the network topology that implements flow-based packet forwarding, wherein the disengaging comprises:
    selecting an inheritor;
    migrating flows from the target node to the inheritor;
    duplicating a flow table from the target node to the inheritor, wherein the flow table comprises a set of entries including flow keys identifying flows and corresponding actions to be performed on packets matching the flow keys;
    informing a migration manager that the target node is disengaged from the cluster; and
    broadcasting to peer nodes of the target node that the target node is replaced by the inheritor.

12. The apparatus of claim 11, wherein the first layer of the network topology includes a forwarding engine and the second layer of the network topology comprises the target node and the inheritor.

13. The apparatus of claim 11, wherein the apparatus is further configured for:
    purging the flow table;

identifying that the flow table is empty and no data packet is pending in a RX/TX queue of the target node; and setting a status of the target node to indicate that the target node is disengaged from the cluster.

14. Non-transitory media encoding logic that includes code for execution and when executed by a processor is operable to perform operations comprising:

disengaging a target node from a cluster comprising a first layer of a network topology that implements hash-based packet forwarding, and a second layer of the network topology that implements flow-based packet forwarding, wherein the disengaging comprises:

selecting an inheritor;

migrating flows from the target node to the inheritor;

duplicating a flow table from the target node to the inheritor, wherein the flow table comprises a set of entries including flow keys identifying flows and corresponding actions to be performed on packets matching the flow keys;

informing a migration manager that the target node is disengaged from the cluster; and broadcasting to peer nodes of the target node that the target node is replaced by the inheritor.

15. The media of claim 14, wherein the first layer of the network topology includes a forwarding engine and the second layer of the network topology comprises the target node and the inheritor.

16. The media of claim 14, wherein the inheritor comprises a peer node of the target node having a least number of flows within a subset of nodes of the cluster.

17. The media of claim 14, the operations further comprising:

purging the flow table;

identifying that the flow table is empty and no data packet is pending in a RX/TX queue of the target node; and setting a status of the target node to indicate that the target node is disengaged from the cluster.

* * * * *